United States Patent
Ettireddy et al.

(10) Patent No.: US 9,482,131 B2
(45) Date of Patent: Nov. 1, 2016

(54) EXHAUST SYSTEM WITH ZONE COATED CATALYST

(71) Applicant: Tenneco Automotive Operating Company Inc., Lake Forest, IL (US)

(72) Inventors: Padmanabha Reddy Ettireddy, Canton, MI (US); Adam J. Kotrba, Laingsburg, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 41 days.

(21) Appl. No.: 14/592,034

(22) Filed: Jan. 8, 2015

(65) Prior Publication Data
US 2016/0201537 A1    Jul. 14, 2016

(51) Int. Cl.
| | | |
|---|---|---|
| F01N 3/00 | (2006.01) | |
| F01N 3/10 | (2006.01) | |
| F01N 3/20 | (2006.01) | |
| F01N 3/021 | (2006.01) | |
| F01N 3/08 | (2006.01) | |

(52) U.S. Cl.
CPC ............ *F01N 3/2066* (2013.01); *F01N 3/021* (2013.01); *F01N 3/0842* (2013.01); *F01N 3/0857* (2013.01); *F01N 3/101* (2013.01)

(58) Field of Classification Search
CPC ...... F01N 3/28; F01N 3/2803; F01N 3/2066; F01N 3/021; F01N 3/101; F01N 3/0857; F01N 3/0842
USPC .......................................... 60/297, 299, 301
See application file for complete search history.

(56) References Cited

U.S. PATENT DOCUMENTS

| | | | |
|---|---|---|---|
| 5,043,311 A | 8/1991 | Engler et al. | |
| 6,375,910 B1 | 4/2002 | Deeba et al. | |
| 7,374,729 B2 * | 5/2008 | Chen ................. | B01D 53/945 422/177 |
| 7,922,988 B2 * | 4/2011 | Deeba ................. | B01D 53/945 422/168 |
| 8,252,258 B2 | 8/2012 | Muller-Stach et al. | |
| 8,440,155 B2 | 5/2013 | Chivilikhin et al. | |
| 2010/0263358 A1 | 10/2010 | Chen et al. | |

(Continued)

FOREIGN PATENT DOCUMENTS

| | | |
|---|---|---|
| JP | 2012523313 A | 10/2012 |
| WO | WO-2014012174 A1 | 1/2014 |

OTHER PUBLICATIONS

SAE Paper No. 962076 Entitled "Numerical Approach for Improving the Conversion Characteristics of Exhaust Catalysts Under Warming-Up Condition"; Baba Et Al., Oct. 1996.

*Primary Examiner* — Thomas Denion
*Assistant Examiner* — Diem Tran
(74) *Attorney, Agent, or Firm* — Harness, Dickey & Pierce, P.L.C.

(57) ABSTRACT

An after-treatment system for treating exhaust gas discharged from a combustion engine, the after-treatment system comprising an exhaust after-treatment component including an exhaust after-treatment substrate, the exhaust after-treatment substrate including an inlet face including a first zone having a first catalyst located at a center of the inlet face, and a second zone having a second catalyst located radially outward from the center of the inlet face, wherein an amount of the exhaust gas that travels through the first zone is greater than an amount of the exhaust gas that passes through the second zone, and a catalyst loading of the first catalyst in the first zone is less than a catalyst loading of the second catalyst in the second zone.

25 Claims, 4 Drawing Sheets

(56) References Cited

U.S. PATENT DOCUMENTS

| | | |
|---|---|---|
| 2011/0116982 A1 | 5/2011 | Kunieda et al. |
| 2011/0162348 A1 | 7/2011 | Kim et al. |
| 2012/0255283 A1 | 10/2012 | Oger et al. |
| 2013/0028819 A1 | 1/2013 | Plati et al. |
| 2013/0189172 A1 | 7/2013 | Spurk et al. |
| 2014/0349841 A1 | 11/2014 | Patchett et al. |

\* cited by examiner

EXHAUST SYSTEM WITH ZONE COATED CATALYST

FIELD

The present disclosure relates to an exhaust system with a zone coated catalyst substrate.

BACKGROUND

This section provides background information related to the present disclosure which is not necessarily prior art.

The flow of exhaust through an exhaust treatment component typically exhibits a non-uniform distribution across an inlet face of the component. The exhaust flow is generally greater at the center portion of the inlet face in comparison to other locations across the inlet face. Since a greater amount of exhaust flows through the center portion of the exhaust treatment component, the center portion of the component treats a greater amount of the exhaust in comparison to the locations positioned radially outward from the center portion. Depending on the chemical reaction that occurs when the component treats the constituents of the exhaust gas (i.e., oxidation or reduction), a non-uniform temperature distribution may be generated within the exhaust treatment component. The temperature at the center portion of the component is higher in comparison to the other locations. These differences in temperature can cause the component to experience thermal gradients (e.g., steady state thermal gradients as treating of the exhaust occurs, and thermal transients as the substrate heats up and cools down) of 75 C to 100 C that can damage (e.g., fracture) the exhaust treatment component. In addition, the conversion efficiency may be lower than desired as a result of the non-uniform flow and temperature distribution through the exhaust treatment component.

SUMMARY

This section provides a general summary of the disclosure, and is not a comprehensive disclosure of its full scope or all of its features.

The present disclosure provides an exhaust after-treatment component for treating exhaust gas discharged from a combustion engine. The after-treatment component includes an exhaust after-treatment substrate, the exhaust after-treatment substrate including a first zone, and a second zone surrounding the first zone and having a second catalyst, wherein an amount of the exhaust gas that travels through the first zone is greater than an amount of the exhaust gas that passes through the second zone, a catalyst loading of the first catalyst in the first zone is less than a catalyst loading of the second catalyst in the second zone, and a shape and location of the first zone is selected by the amount of the exhaust gas that passes through the first zone.

The present disclosure also provides an exhaust after-treatment component for treating exhaust gas discharged from a combustion engine. The after-treatment component includes an exhaust after-treatment substrate, the exhaust after-treatment substrate including an inlet portion and an outlet portion with a plurality of first zones extending along a length of the cylindrical exhaust after-treatment substrate between the inlet portion and the outlet portion, and each of the first zones having a first catalyst; and a second zone having a second catalyst that surrounds each of the first zones and extends along the length of the exhaust after-treatment substrate between the inlet portion and the outlet portion, wherein an amount of the exhaust gas that travels through each of the first zones is greater than an amount of the exhaust gas that passes through the second zone, a catalyst loading of the first catalyst in each of the first zones is less than a catalyst loading of the second catalyst in the second zone, and a shape and location of each of the first zones is selected by the amount of the exhaust gas that passes through each of the first zones.

The present disclosure also provides an after-treatment system for treating exhaust gas discharged from a combustion engine. The after-treatment system includes an exhaust after-treatment component; an exhaust after-treatment substrate housed within the exhaust after-treatment component, the exhaust after-treatment substrate including an inlet portion and an outlet portion; the inlet portion including a first zone having a first catalyst that extends along a length of the inlet portion, and a second zone having a second catalyst that surrounds the first zone and extends along the length of the inlet portion; the outlet portion including a third zone having a third catalyst that extends along a length of the outlet portion, and a fourth zone having a fourth catalyst that surrounds the third zone that extends along the length of the outlet portion; wherein a catalyst loading of the first catalyst in the first zone is greater than a catalyst loading of the second catalyst in the second zone, and a catalyst loading of the third catalyst in the third zone is greater than a catalyst loading of the fourth catalyst in the fourth zone.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
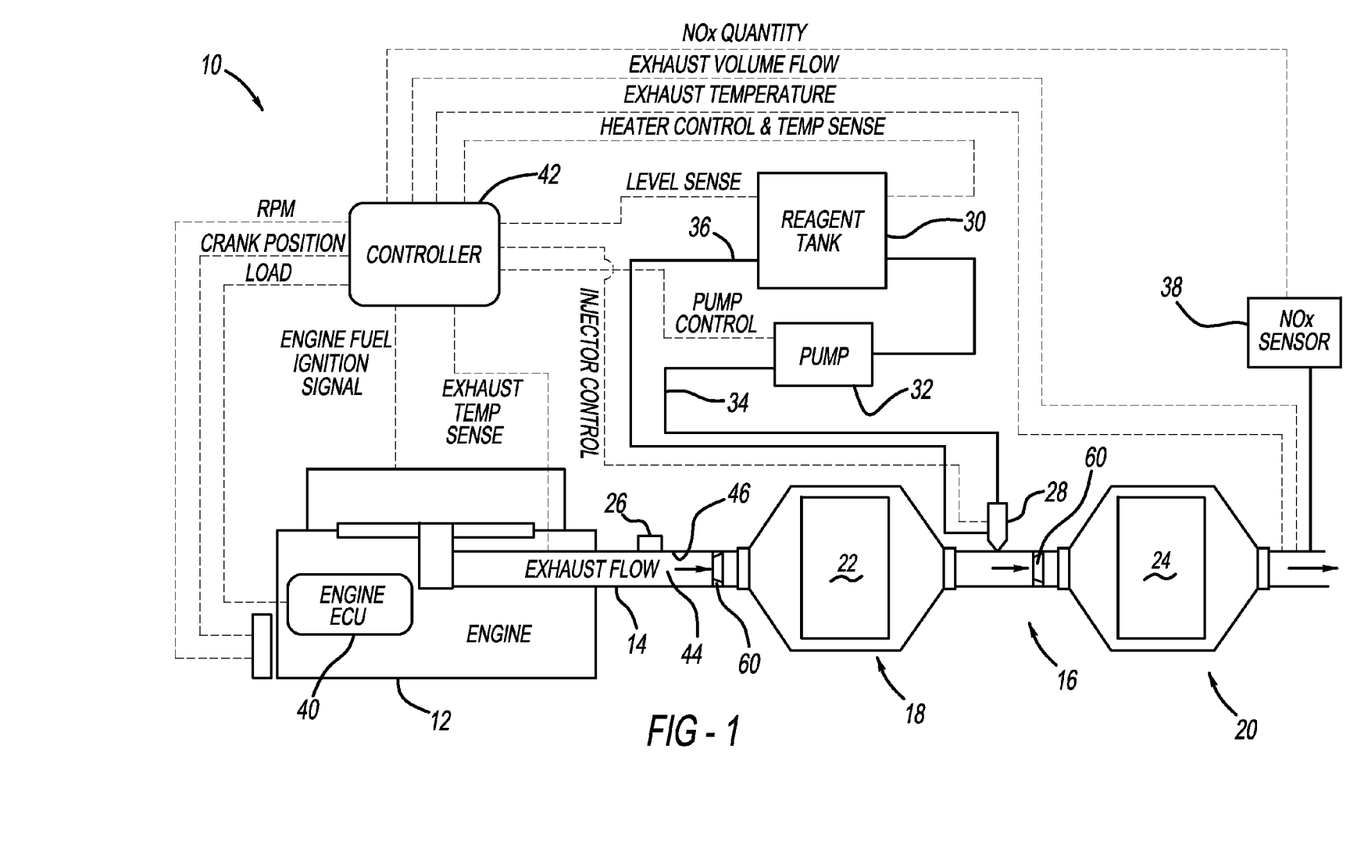
FIG. 1 is a schematic representation of an engine exhaust system according to a principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed a pair of exhaust treatment components 18 and 20, which can include catalyst-coated substrates or filters 22 and 24. Catalyst-coated substrates or filters 22 and 24 can be any combination of a diesel particulate filter (DPF), a diesel oxidation catalyst (DOC) component, a selective catalytic reduction (SCR) component, a lean $NO_X$ catalyst, an ammonia slip catalyst, a catalyst-coated (e.g., SCR or DOC) DPF, $NO_X$ absorber, $CO_2$ capture catalyst, or any other type or combination of exhaust treatment devices known to one skilled in the art.

Although not required by the present disclosure, exhaust after-treatment system 16 can further include components such as a thermal enhancement device or burner 26 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment substrate 22 or 24 is a DPF.

To assist in reduction of the emissions produced by engine 12, exhaust after-treatment system 16 can include a dosing module 28 for periodically dosing an exhaust treatment fluid into the exhaust stream. As illustrated in FIG. 1, dosing module 28 can be located upstream of exhaust treatment component 18, and is operable to inject an exhaust treatment fluid into the exhaust stream. In this regard, dosing module 28 is in fluid communication with a reagent tank 30 and a pump 32 by way of inlet line 34 to dose an exhaust treatment fluid such as diesel fuel or urea into the exhaust passage 14 upstream of exhaust treatment components 18 and 20. Dosing module 28 can also be in communication with reagent tank 30 via return line 36. Return line 36 allows for any exhaust treatment fluid not dosed into the exhaust stream to be returned to reagent tank 30. Flow of the exhaust treatment fluid through inlet line 34, dosing module 28, and return line 36 also assists in cooling dosing module 28 so that dosing module 28 does not overheat. Although not illustrated in the drawings, dosing module 28 can be configured to include a cooling jacket that passes a coolant around dosing module 28 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 38 may be positioned downstream from exhaust treatment component 18. $NO_x$ sensor or meter 38 may also be positioned upstream or between the exhaust treatment components 18 and 20. $NO_x$ sensor 38 is operable to output a signal indicative of the exhaust $NO_x$ content to an engine control unit 40. $NO_x$ sensor or meter 38 may also be replaced by a particulate matter sensor. All or some of the engine operating parameters may be supplied from engine control unit 40 via the engine/vehicle databus to a reagent electronic dosing controller 42. The reagent electronic dosing controller 42 could also be included as part of the engine control unit 40. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 28. Accordingly, although only a single dosing module 28 is illustrated for dosing exhaust treatment fluid, it should be understood that multiple dosing modules 28 for reagent injection are contemplated by the present disclosure.

With continued reference to FIG. 1, as well as FIGS. 2-6, the amount of exhaust flow is greater in the illustrated embodiment at a center 44 of the exhaust passage 14 in comparison to locations positioned at a wall 46 of the exhaust passage 14. Thus, the exhaust flow is generally greater through a center portion 48 of a substrate inlet face 50 in comparison to other locations across the substrate inlet face 50 positioned radially outward from the center portion 48 of the substrate inlet face 50. Since a greater amount of exhaust flows through the center portion 48 of the substrate inlet face 50, the center portion 48 of the substrate 22, 24 treats a greater amount of the exhaust in comparison to the locations positioned radially outward from the center portion 48. Depending on the chemical reaction that occurs when the substrate treats the constituents of the exhaust gas (i.e., oxidation or reduction), a non-uniform temperature distribution may be generated within the substrate 22, 24. The temperature of the substrate 22, 24 at the center portion 48 of the substrate 22, 24 may be higher in comparison to the locations positioned radially outward from the center 48 of the substrate 22, 24. These differences in temperature can cause the substrate 22, 24 to experience thermal gradients of 75 C to 100 C that can damage (e.g., fracture) the substrate 22, 24. Although the amount of exhaust flow is described above as being greater at the center 44 of the exhaust passage 14, it should be understood that this is typically directed to linear exhaust systems. In other words, it should be understood that the amounts of exhaust flow will be different in exhaust systems that include curved or bent exhaust passages 14, or in exhaust systems that include mixing devices 60 as will be described in more detail below.

Figure 2:
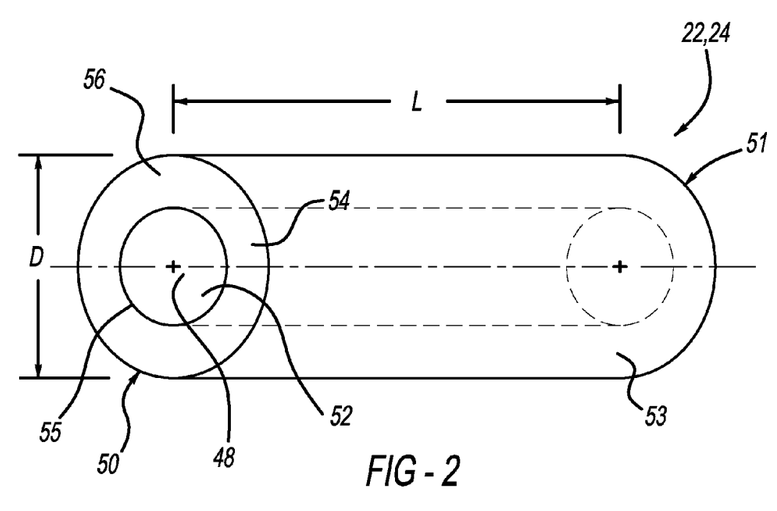
FIG. 2 is a perspective view of an exemplary exhaust treatment component substrate according to a principle of the present disclosure.
Figure 3:
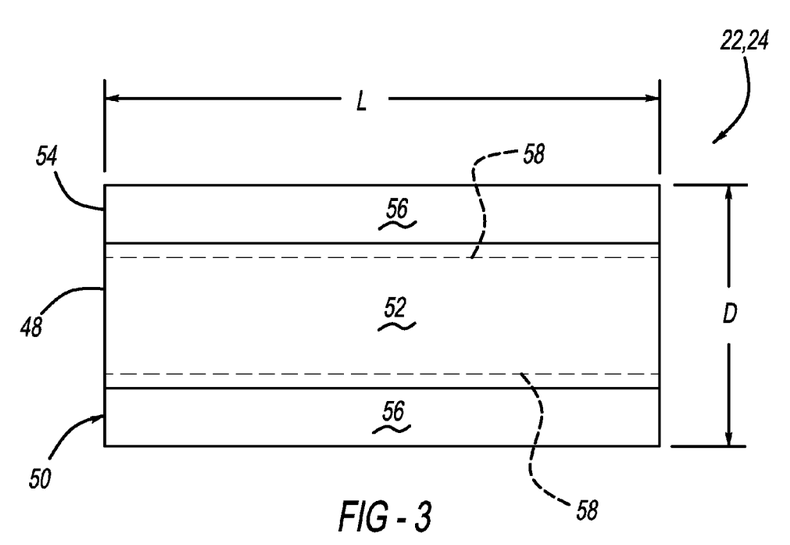
FIG. 3 is a cross-sectional view of the exhaust treatment component substrate illustrated in FIG. 2.
Figure 4:
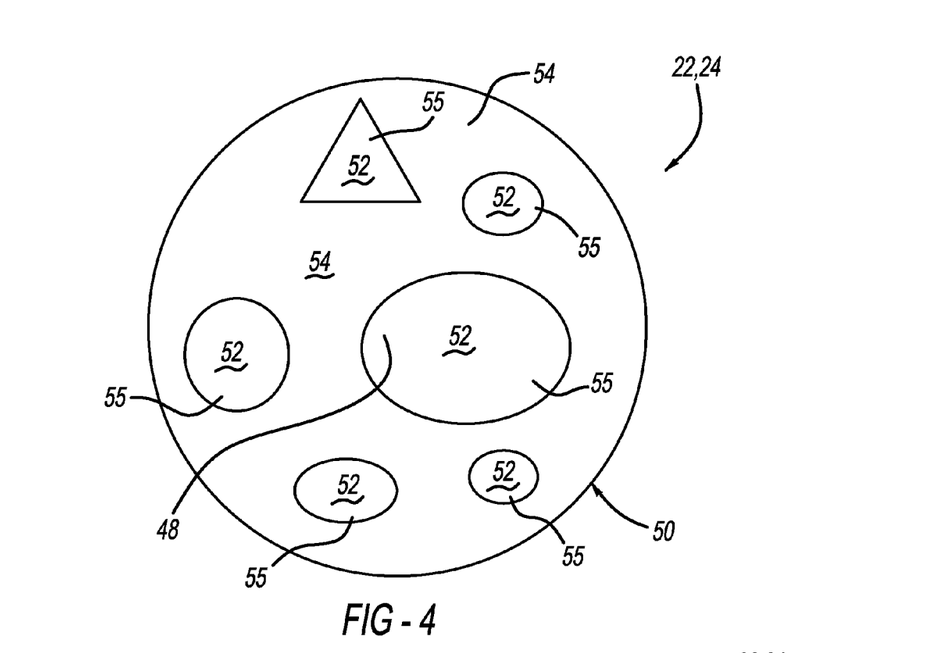
FIG. 4 is a front-perspective view of another exemplary exhaust treatment component substrate according to a principle of the present disclosure.

Now referring to FIGS. 2 and 3 of the application, the present disclosure is directed to an exhaust treatment component substrate 22, 24 that is radially zone-coated. Exhaust treatment component substrates 22 and 24 may be cylindrically-shaped having an axial length L and a diameter D. Substrate 22, 24 includes an inlet face 50 and an outlet face 51, with an external surface 53 extending between inlet face 50 and outlet face 51.

A cylindrically-shaped center portion 48 of substrates 22 and 24 may be identified as a first zone 52 that extends along the entire axial length L, while a cylindrically-shaped outer peripheral portion 54 of the substrates 22 and 24 located radially outward from the center portion 48 is termed a second zone 56 that also extends along the entire axial length L. The first zone 52 includes a first catalyst loading. The second zone 56 includes a second catalyst loading. According to the present disclosure, the first catalyst loading in the first zone 52 is less than the second catalyst loading in the second zone 56. By adjusting the catalyst loading in each of the first and second zones 52 and 56, the amount of heat generated during the catalytic reactions can be substantially evenly distributed throughout the exhaust treatment component substrate 22, 24, especially during increased exhaust flow rates that occur during greater engine speeds when the differential flow balance between the first zone 52 and the second zone 56 is greatest. Although a cylindrically-shaped substrate 22, 24 is illustrated, it should be understood that the principles of the present disclosure are equally applicable to substrates 22, 24 that are parallelpiped-shaped, oval-shaped, and prism-shaped without departing from the scope of the present disclosure. It should be appreciated that the term substrates 22, 24 includes not only the ceramic material described below, but may also include a filter material or any other suitable structure (e.g., metal) for carrying a catalyst. In addition, although center and peripheral portions 48 and 52 are described above as being cylindrically-shaped, it should be understood that center and peripheral portions 48 and 52 should not be limited thereto. That is, center portion 48 can be oval, square, rectangular, triangular, or any other shape desired by one skilled in the art, with peripheral portion 52 having a shape that corresponds and surrounds center portion 48.

The exhaust treatment component substrates 22 and 24 are generally formed from a ceramic material such as cordierite. Alternatively, substrates 22 and 24 may be metallic. Regardless, to provide the ceramic or metallic material with catalyst, the ceramic or metallic material can be soaked in a wash-coat solution including the catalyst material, sprayed with the wash-coat catalyst solution, or the catalyst material may be intermixed with the ceramic material and extruded therewith. For example, the first zone 52 having lower catalyst content in comparison to the second zone 56 can be extruded first, and the second zone 56 having the greater catalyst content can be extruded second. The first and second zones 52 and 56 can then be mated and pasted together by an adhesive (not shown) or the like such that a boundary surface 57 exists between first zone 52 and second zone 56. In this manner, the catalyst content in each of the first and second zones 52 and 56 can be strictly controlled such that a distinct boundary exists between the first and second zones 52 and 56.

Alternatively, a single monolithic ceramic substrate 22, 24 can be prepared. The first zone 52 can be catalyzed by dispersing a first wash-coat solution including the catalyst material throughout the first zone 52 along the entire axial length L of the substrate 22, 24. The second zone 56 may be catalyzed by dispersing a second wash-coat solution having greater catalyst content around a periphery of the first zone 52 and along the entire axial length L of the substrate 52, 54. As there may be some overlap between the first and second zones 52 and 56 when dispersing the first and second catalyst solutions, a third zone 58 may be created between the first and second zones 52 and 56, with the third zone 58 having greater catalyst content than each of the first and second zones 52 and 56. As the third zone 58 is located more radially outward in comparison to the first zone 52, the thermal gradient created is not as great in comparison to conventional catalyzed substrates.

Yet another alternative is to use a single catalyzed solution to catalyze the monolithic substrate 22, 24. By adjusting an amount of the catalyst solution that is provided to the first zone 52 in comparison to an amount of the catalyst solution that is provided to the second zone 56, the catalyst content in each zone 52 and 56 can be adjusted appropriately. Further, this process can result in a catalyst gradient that gradually increases as the distance from the center 48 of the substrate 22, 24 increases radially outward.

Yet another alternative is to pre-determine through computational flow dynamics (CFD) the areas of the substrate 22, 24 that will experience greater amounts of exhaust flow in comparison to other areas of the substrate 22, 24. Once it is determined which areas of the substrate 22, 24 receive the greatest amount of exhaust flow, these areas can be provided with catalyst in amounts that are less than the areas that receive lesser amounts of exhaust flow. For example, referring to FIG. 4 of the application, several first zones 52 having different shapes (e.g., circular, oval, and triangular, etc.) are spaced apart from one another. Inlet face portions 55 of the first zones 52 may be scattered across the face 50 of the substrate 22, 24 due to the influence of a mixing device 60 located upstream from the substrates 22, 24 that increases turbulence in the exhaust flow. Regardless, because these first zones 52 have been pre-determined to receive a greater amount of exhaust flow through use of CFD, these first zones 52 can be provided with a different catalyst amount in comparison to the second zones 56 that receive a lesser amount of exhaust flow. Similar to the above-described methods, the catalyst loading can be varied by using different catalyst solutions (i.e., solutions with different catalyst loadings) in these zones 52 and 56, or by using differing amounts of the same catalyst solution in these zones 52 and 56. Further, it should be understood that the differently-shaped zones 52 and 56 may extend along the entire axial length L of the substrates 22, 24.

Yet another alternative is to catalyze a plurality of separate catalyst substrates each having different catalyst contents or catalysts. Each of the separate catalyst substrates can then be pasted together in a desired orientation according to the determined or desired exhaust flow conditions, and then shaped according to the desired canister used to support the resultant substrates 22 and 24. In this regard, each of the separate catalyst substrates can be parallelpiped shapes, and after the parallelepiped-shaped catalysts are pasted together, edges of the substrates can be trimmed to dispose the pasted substrates within a round, oval, or triangular-shaped canister or housing.

In addition to the use of a mixing device 60 that can affect exhaust flow through the substrates 22, 24, it should be appreciated that configurations of exhaust conduit 14 may also affect the exhaust flow through substrates 22, 24. More specifically, it will be appreciated that exhaust conduit 14 is not necessarily linear, but may include bends, different cross-sectional diameters, and different cross-sectional shapes along the length thereof to account for different configurations in the packaging and plumbing of the exhaust after-treatment system 16. Each of these variables can affect the flow of exhaust before reaching substrates 22, 24. Regardless, so long as the use of CFD can determine the portions of the substrates 22, 24 that will receive greater or less amounts of exhaust flow, the catalyzing of the substrates 22, 24 can be tailored accordingly. What's more, it should be understood that substrate 22 can include a different configuration of the first and second zones 52 and 56 in comparison to the substrate 24.

Although the above-noted methods of producing the substrates 22, 24 are preferred, it should be understood that the present disclosure contemplates that other manufacturing methods will be known to one skilled in the art. So long as the areas of the substrate 22, 24 that receive greater amounts of exhaust flow are provided with a lesser amount of catalyst, any method known to one skilled in the art may be used to catalyze the different zones 52, 56 of the substrate 22, 24.

The catalysts that may be dispersed over the substrates 22, 24 include DOC catalysts, SCR catalysts, ammonia slip catalysts, and three-way catalysts that are operable to oxidize and reduce the constituents of the exhaust stream. Exemplary DOC and ammonia slip catalysts include platinum group metals such as platinum (Pt), palladium (Pd), and the like. It is not out of the scope of the present disclosure to utilize different catalyst materials for DOC and ammonia slip in each of the first and second zones 52 and 56. For example, the present disclosure contemplates that Pt may be used in the first zone 52, and Pd may be used in the second zone 56.

With respect to SCR catalysts, non-platinum group metals are preferably used. Non-platinum group metals that can serve at SCR catalysts include vanadia ($V_2O_5$), copper (Cu), and iron (Fe), and mixtures thereof. These metals may be disposed on zeolite materials, if desired. In addition, a metal oxide supported on titanium oxide ($MO_x/TiO_2$), a metal oxide supported on a titania-silica ($TiO_2/SiO_2$) mixed oxide support, or a metal oxide supported on a beta zeolite may be used. Metals used for such metal oxide catalysts could include ammonium metavenadate (V), manganese (Mn), iron (Fe), cobalt (Co), copper (Cu), cerium (Ce), and mixtures thereof, for example. It is not out of the scope of the present disclosure to utilize different catalyst materials for SCR in each of the first and second zones 52 and 56. For example, the present disclosure contemplates that iron (Fe) may be used in the first zone 52 due to its temperature resistance, while copper (Cu) is used in the second zone 56.

Exemplary three-way catalysts include mixtures of the DOC and SCR catalysts discussed above. It is not out of the scope of the present disclosure to utilize different catalyst mixtures in each of the first and second zones 52 and 56. For example, the present disclosure contemplates that a mixture of Pt and vanadia may be used in the first zone 52, and a mixture of Pd and Cu may be used in the second zone 56.

The catalyst loadings of each zone 52, 56 are determined by the specific application for exhaust after-treatment. For example, an automobile powered by a gasoline-fueled internal combustion engine will generally have lower exhaust flow rates than a locomotive driven by a high horsepower diesel engine. The amount of catalyst per unit volume in the high horsepower diesel engine exhaust treatment component substrate 22, 24, therefore, will require a greater amount of catalyst to ensure sufficient treatment of the exhaust gas. Regardless, the important feature according to the present disclosure is that the zones 52 that receive a greater amount of exhaust flow have a lower catalyst loading in comparison to the zones 56 that receive a lesser amount of exhaust flow. By reducing the amount of catalyst in the zones 52 that receive more exhaust, the amount of heat generated during the reduction and oxidation reactions of the exhaust constituents is controlled so as to prevent larger thermal gradients being formed in the substrate 22, 24. In other words, the catalyst loading in each of the first and second zones 52 and 56 is selected so that the amount heat generated in each of first and second zones 52 and 56 is substantially equal. In this manner, damage to the catalytic substrates 22, 24 can be prevented, or at least substantially minimized.

Figure 5:
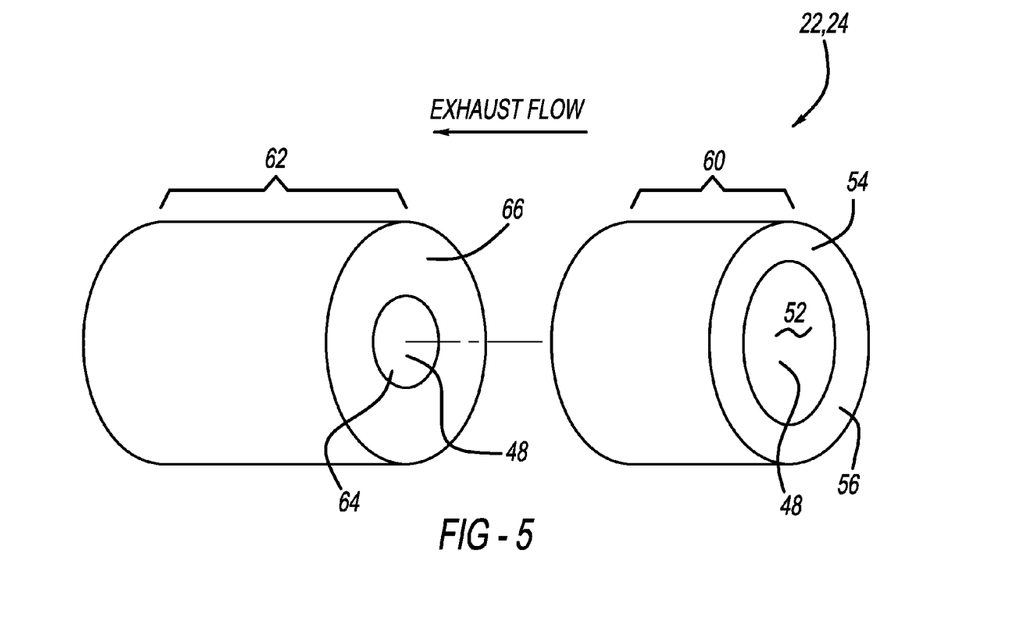
FIG. 5 is an exploded perspective view of another exemplary exhaust treatment component substrate according to a principle of the present disclosure.
Figure 6:
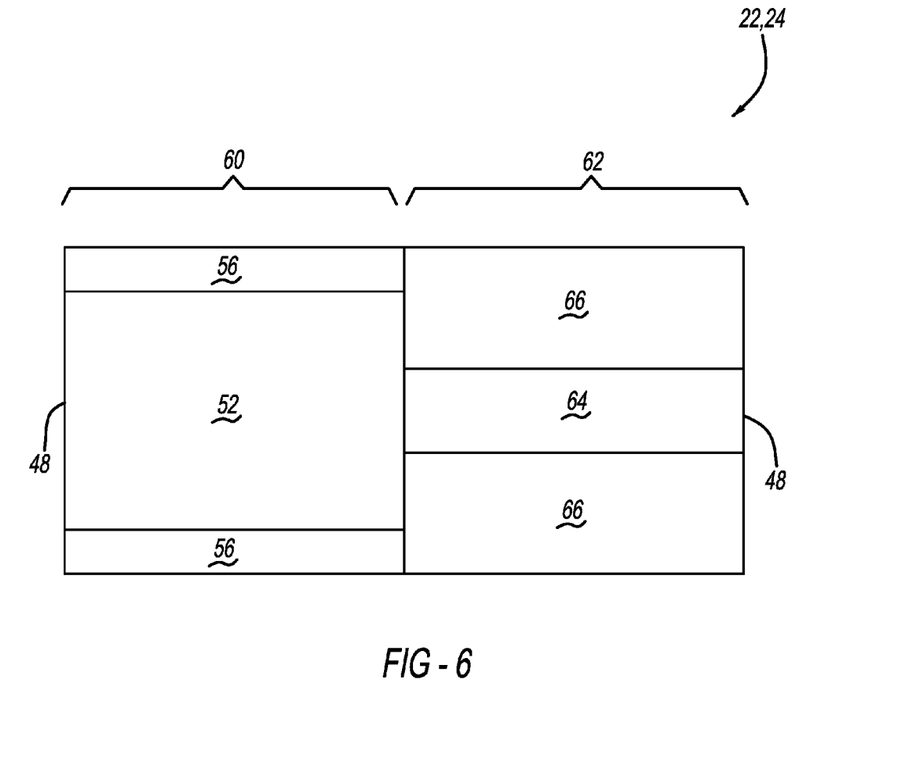
FIG. 6 is a cross-sectional view of the exhaust treatment component illustrated in FIG. 5, in assembled form.

Now referring to FIGS. 5 and 6, another exemplary embodiment according to the present disclosure will be described. The exhaust treatment component substrate 22, 24 illustrated in FIGS. 5 and 6 is similar to above-described embodiments where the substrate 22, 24 includes a first zone 52 at a center portion 48 of the substrate 22, 24, and a second zone 56 positioned radially outward from the first zone 52. The exhaust treatment component substrate 22, 24 also includes an inlet portion 60 and an outlet portion 62. The outlet portion 62 includes a third zone 64 at a center 48 of the substrate, and a fourth zone 66 positioned radially outward from the third zone 64. Inlet portion 60 is positioned immediately upstream and adjacent to outlet portion 62. Although inlet portion 60 is illustrated as abutting outlet portion 62 in FIG. 6, it should be understood that inlet portion 60 may be spaced apart from outlet portion 62 by an air gap (not shown), or by a gap (not shown) filled with an insulating material.

In contrast to previous embodiments, the catalyst loading in the first zone 52 is greater than the catalyst loading in the second zone 56. First zone 52 has a volume that is greater than that of the second zone 56. In contrast to the inlet portion 60, the outlet portion 62 including third zone 64 has a volume that is less than that of the fourth zone 66. In addition, the catalyst loading in the third zone 64 is greater than that of the fourth zone 66. This configuration assists in ensuring that the maximum amount of exhaust gases are sufficiently treated as they pass through the exhaust treatment component substrate 22, 24. It should also be understood that the first, second, third, and fourth zones are not required to carry a catalyst.

More specifically, as noted above, the greatest amount of exhaust gas generally passes through the center portion 48 of the exhaust treatment component substrate 22, 24 (i.e., the first zone 52). Because the second zone 56 includes a smaller volume in comparison to the first zone 52, however, there is a possibility that a sufficient amount of the exhaust gases passing through the second zone 56 are not sufficiently treated. In addition, because the exhaust gas temperature will generally reduce as it passes through the exhaust treatment component substrate 22, 24; there is a lower occurrence of an extreme temperature gradient developing downstream from the inlet portion 60 of the exhaust treatment component substrate 22, 24. Thus, to ensure that exhaust gases passing through the outer peripheral portion 54 of the exhaust treatment component substrate 22, 24 are sufficiently treated, the fourth zone 66 in the outlet portion 62 of the exhaust treatment component substrate 22, 24 is made larger in comparison to the third zone 64. Moreover, as a majority of the exhaust gases passing through first zone 52 have been treated in inlet portion 60, third zone 64 can have a smaller volume than fourth zone 66 as there is less likelihood of the exhaust gases in third zone 64 not being properly treated as the gases pass through outlet portion 62.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment component for treating exhaust gas discharged from a combustion engine, the after-treatment component comprising:
    an exhaust after-treatment substrate, the exhaust after-treatment substrate including a first zone having a first catalyst, and a second zone surrounding the first zone and having a second catalyst,
    wherein an amount of the exhaust gas that travels through the first zone is greater than an amount of the exhaust gas that passes through the second zone,
    a catalyst loading of the first catalyst in the first zone is less than a catalyst loading of the second catalyst in the second zone, and
    a shape and location of the first zone is selected by the amount of the exhaust gas that passes through the first zone, wherein the first catalyst includes a first catalyst material and the second catalyst includes a second catalyst material different from the first catalyst material.

2. The after-treatment component according to claim 1, wherein the catalyst loading in the first zone minimizes the generation of a temperature gradient between the first zone and the second zone during treatment of the exhaust gas.

3. The after-treatment component according to claim 1, further comprising a plurality of first zones, with each of the first zones having a catalyst loading that is less than the catalyst loading in the second zone, and a shape and location of each of the first zones being selected by the amount of the exhaust gas that passes through each of the first zones.

4. The after-treatment component according to claim 1, wherein the shape and location of the first zone is determined using computational flow dynamics.

5. The after-treatment component according to claim 1, wherein the shape of the first zone is one of circular, oval, triangular, square, and rectangular.

6. The after-treatment component according to claim 1, wherein the shape of the first zone extends along an axial length of the substrate.

7. The after-treatment component according to claim 1, wherein the first and second catalyst each include at least one catalyst selected from the group consisting of an oxidation catalyst, a selective catalytic reduction (SCR) catalyst, an ammonia slip catalyst, a three-way catalyst, a $NO_X$ absorber, and a $CO_2$ capture catalyst.

8. An exhaust after-treatment component for treating exhaust gas discharged from a combustion engine, the after-treatment component comprising:
    an exhaust after-treatment substrate, the exhaust after-treatment substrate including an inlet portion and an outlet portion with a plurality of first zones extending along a length of the cylindrical exhaust after-treatment substrate between the inlet portion and the outlet portion, and each of the first zones being spaced apart from one another and having a first catalyst; and
    a second zone having a second catalyst that surrounds each of the first zones and extends along the length of the exhaust after-treatment substrate between the inlet portion and the outlet portion,
    wherein an amount of the exhaust gas that travels through each of the first zones is greater than an amount of the exhaust gas that passes through the second zone,
    a catalyst loading of the first catalyst in each of the first zones is less than a catalyst loading of the second catalyst in the second zone, and
    a shape and location of each of the first zones is selected by the amount of the exhaust gas that passes through each of the first zones.

9. The after-treatment component according to claim 8, wherein the catalyst loading in each of the first zones minimizes the generation of a temperature gradient between each of the first zones and the second zone during treatment of the exhaust gas.

10. The after-treatment component according to claim 8, wherein the shape and location of each of the first zones is determined using computational flow dynamics.

11. The after-treatment component according to claim 8, wherein the shapes of the first zones are selected from the group consisting of circular, oval, triangular, square, and rectangular.

12. The after-treatment component according to claim 8, wherein the shapes of each of the first zones each extend along an axial length of the substrate.

13. The after-treatment component according to claim 8, wherein the first catalyst is the same as the second catalyst.

14. The after-treatment component according to claim 13, wherein the first and second catalyst each include at least one catalyst selected from the group consisting of an oxidation catalyst, a selective catalytic reduction (SCR) catalyst, an ammonia slip catalyst, a three-way catalyst, a $NO_X$ absorber, and a $CO_2$ capture catalyst.

15. The after-treatment component according to claim 8, wherein the first catalyst is different from the second catalyst.

16. The after-treatment component according to claim 15, wherein the first and second catalyst each include at least one catalyst selected from the group consisting of an oxidation catalyst, a selective catalytic reduction (SCR) catalyst, an ammonia slip catalyst, a three-way catalyst, a $NO_X$ absorber, and a $CO_2$ capture catalyst.

17. An after-treatment system for treating exhaust gas discharged from a combustion engine, the after-treatment system comprising:
an exhaust after-treatment component;
an exhaust after-treatment substrate housed within the exhaust after-treatment component, the exhaust after-treatment substrate including an inlet portion and an outlet portion, wherein the outlet portion extends downstream of the inlet portion;
the inlet portion including a first zone having a first volume and a first catalyst that extends along a length of the inlet portion, and a second zone having a second volume less than the first volume and a second catalyst that extends along the length of the inlet portion;
the outlet portion including a third zone having a third volume and a third catalyst that extends along a length of the outlet portion, and a fourth zone having a fourth volume greater than the third volume and a fourth catalyst that extends along the length of the outlet portion;
wherein a catalyst loading of the first catalyst in the first zone is greater than a catalyst loading of the second catalyst in the second zone,
and a catalyst loading of the third catalyst in the third zone is greater than a catalyst loading of the fourth catalyst in the fourth zone.

18. The after-treatment system according to claim 17, wherein the first zone communicates with at least one of the third zone and the fourth zone, and the second zone communicates with at least one of the third and the fourth zone.

19. The after-treatment system according to claim 17, wherein at least one of the first, second, third, and fourth zones is devoid of a catalyst.

20. The after-treatment system according to claim 17, wherein the first and third catalysts are the same, the second and fourth catalysts are the same, and the first and third catalysts are different from the second and fourth catalysts.

21. The after-treatment system according to claim 20, wherein each of the first, second, third, and fourth catalysts each include at least one catalyst selected from the group consisting of an oxidation catalyst, a selective catalytic reduction (SCR) catalyst, an ammonia slip catalyst, a three-way catalyst, a $NO_X$ absorber, and a $CO_2$ capture catalyst.

22. An after-treatment system for treating exhaust gas discharged from a combustion engine, the after-treatment system comprising:
an exhaust after-treatment component;
an exhaust after-treatment substrate housed within the exhaust after-treatment component, the exhaust after-treatment substrate including an inlet portion and an outlet portion;
the inlet portion including a first zone having a first catalyst that extends along a length of the inlet portion, and a second zone having a second catalyst that extends along the length of the inlet portion;
the outlet portion including a third zone having a third catalyst that extends along a length of the outlet portion, and a fourth zone having a fourth catalyst that extends along the length of the outlet portion;
wherein a catalyst loading of the first catalyst in the first zone is greater than a catalyst loading of the second catalyst in the second zone,
and a catalyst loading of the third catalyst in the third zone is greater than a catalyst loading of the fourth catalyst in the fourth zone, wherein the first catalyst is the same as the second catalyst, and the third catalyst is the same as the fourth catalyst, the first and second catalysts being different than the third and fourth catalysts.

23. The after-treatment system according to claim 22, wherein each of the first, second, third, and fourth catalysts each include at least one catalyst selected from the group consisting of an oxidation catalyst, a selective catalytic reduction (SCR) catalyst, an ammonia slip catalyst, a three-way catalyst, a $NO_X$ absorber, and a $CO_2$ capture catalyst.

24. An after-treatment system for treating exhaust gas discharged from a combustion engine, the after-treatment system comprising:
an exhaust after-treatment component;
an exhaust after-treatment substrate housed within the exhaust after-treatment component, the exhaust after-treatment substrate including an inlet portion and an outlet portion;
the inlet portion including a first zone having a first catalyst that extends along a length of the inlet portion, and a second zone having a second catalyst that extends along the length of the inlet portion;
the outlet portion including a third zone having a third catalyst that extends along a length of the outlet portion, and a fourth zone having a fourth catalyst that extends along the length of the outlet portion;
wherein a catalyst loading of the first catalyst in the first zone is greater than a catalyst loading of the second catalyst in the second zone,
and a catalyst loading of the third catalyst in the third zone is greater than a catalyst loading of the fourth catalyst in the fourth zone, wherein the first, second, third, and fourth catalysts are each different.

25. The after-treatment system according to claim 24, wherein each of the first, second, third, and fourth catalysts each include at least one catalyst selected from the group consisting of an oxidation catalyst, a selective catalytic reduction (SCR) catalyst, an ammonia slip catalyst, a three-way catalyst, a $NO_X$ absorber, and a $CO_2$ capture catalyst.

* * * * *